United States Patent
Bichler et al.

(10) Patent No.: US 8,606,463 B2
(45) Date of Patent: Dec. 10, 2013

(54) HYDRAULIC STEERING SYSTEM COMPRISING A FIRST AND A SECOND STEERING MEMBER AND VEHICLE COMPRISING A HYDRAULIC STEERING SYSTEM

(75) Inventors: Olivier Bichler, Pluwig (DE); Frederic Lastre, Thionville (FR)

(73) Assignee: Volvo Construction Equipment AB, Eskilstuna (SE)

( * ) Notice: Subject to any disclaimer, the term of this patent is extended or adjusted under 35 U.S.C. 154(b) by 160 days.

(21) Appl. No.: 13/121,687

(22) PCT Filed: Nov. 18, 2008

(86) PCT No.: PCT/SE2008/000647
§ 371 (c)(1),
(2), (4) Date: May 27, 2011

(87) PCT Pub. No.: WO2010/039065
PCT Pub. Date: Apr. 8, 2010

(65) Prior Publication Data
US 2012/0109459 A1 May 3, 2012

(30) Foreign Application Priority Data

Sep. 30, 2008 (WO) .................. PCT/SE2008/000536

(51) Int. Cl.
*B62D 1/22* (2006.01)
*B62D 5/08* (2006.01)
*B62D 5/09* (2006.01)

(52) U.S. Cl.
CPC ... *B62D 1/22* (2013.01); *B62D 5/09* (2013.01)
USPC .............. 701/41; 180/441; 180/422; 180/421

(58) Field of Classification Search
USPC .............................. 701/41; 180/441, 422, 421
See application file for complete search history.

(56) References Cited

U.S. PATENT DOCUMENTS

| 6,408,977 | B1 * | 6/2002 | Obertrifter et al. | 180/442 |
| 7,334,658 | B2 * | 2/2008 | Berg et al. | 180/333 |

(Continued)

FOREIGN PATENT DOCUMENTS

| EP | 1693282 A1 | 8/2008 |
| WO | 03099637 A1 | 12/2003 |

OTHER PUBLICATIONS

International Search Report for corresponding International Application PCT/SE2008/000647.

(Continued)

*Primary Examiner* — James Trammell
*Assistant Examiner* — Todd Melton
(74) *Attorney, Agent, or Firm* — WRB-IP LLP (57) ABSTRACT

A hydraulic steering system for a vehicle includes a first steering member and a second steering member, wherein the first steering member is operationally connected to a first steering valve unit including a first steering valve, and wherein a priority valve controls a flow of a hydraulic fluid to one or more steering cylinders which provide for steering of the vehicle in a desired steering direction, wherein the priority valve gives priority to steering with the first steering member over the steeling with the second steering member. A second steering valve is provided functionally operable in series with a proportional flow control valve, wherein the second steering valve and/or the proportional flow control valve are controlled at least by the second steering member.

27 Claims, 4 Drawing Sheets

(56) References Cited

U.S. PATENT DOCUMENTS

| | | | |
|---|---|---|---|
| 7,597,168 B2 * | 10/2009 | Anderson et al. | 180/247 |
| 7,610,988 B2 * | 11/2009 | Porskrog et al. | 180/417 |
| 2007/0209356 A1 | 9/2007 | Graeve et al. | |
| 2008/0041655 A1 * | 2/2008 | Breiner et al. | 180/418 |

OTHER PUBLICATIONS

International Preliminary Report on Patentability for corresponding International Application PCT/SE2008/000647.

* cited by examiner

HYDRAULIC STEERING SYSTEM COMPRISING A FIRST AND A SECOND STEERING MEMBER AND VEHICLE COMPRISING A HYDRAULIC STEERING SYSTEM

BACKGROUND AND SUMMARY

The invention relates to a hydraulic steering system comprising a first and a second steering member and a vehicle comprising a hydraulic steering system.

Work machines, also known as construction equipment or construction vehicles, as for instance excavators or wheel loaders are vehicles designed for and used in rough off-road surroundings where trucks or passenger cars are either inoperative or, if operated in such surroundings, would probably be damaged when exposed to these rough conditions.

It is known in the art to provide such work machines with a steering wheel and an additional joystick steering which provides an ON/OFF control of the steering direction. Typically, the joystick is used to control a tool, e.g. an excavator bucket, and a steering device is mounted on the joystick which allows steering of the excavator wheels.

U.S. Pat. No. 6,408,977 B1 discloses a method to steer front wheels of a mobile work machine. A normal steering wheel is coupled to an additional joystick steering device. Steering by the joystick steering device is not possible while the steering wheel is being turned. A pressure sensor gives an output depending on the usage of the steering wheel and this signal inhibits the usage of the joystick steering device. Further, if the steering wheel is not turned, but the working machine is moving straight ahead with a high speed above a certain tolerable threshold (for instance in a travel mode on a road) the usage of the joystick steering is also inhibited.

US 2007/0209356 A1 discloses a vehicle comprising a hydraulic system comprising a first steering valve associated with a first user input and a second steering valve associated with a second user input. The first user input is a steering wheel and the second user input is a joystick. The hydraulic system is configured to give priority to the first input over the second input by ways of a priority valve. The hydraulic system includes a single hydraulic circuit. A control circuit is arranged between the priority valve and two solenoid control valves which provide a pilot pressure for the second steering valve.

It is desirable to provide a hydraulic steering system for a vehicle which increases the comfort for the operator and the safety of operation. It is also desirable to provide an adequate method for operating a hydraulic steering system of a vehicle in a comfortable manner.

According to a first aspect of the invention, a hydraulic steering system, for a vehicle is proposed, comprising a first steering member and a second steering member, wherein the first steering member is operationally connected to a first steering valve unit comprising a first steering valve, and wherein a priority valve controls a flow of a hydraulic fluid to one or more steering cylinders which provide for steering of the vehicle in a desired steering direction, wherein the priority valve gives priority to steering with the first steering member over the second steering member in case the first steering member is operated.

A second steering valve is provided functionally operable in series with a proportional flow control valve, wherein the second steering valve and/or the proportional flow control valve are/is controlled by the second steering member. The control can favourably be achieved by an electrical signal or by a hydraulic pilot signal, or by an electromagnetic signal.

Favourably, the second steering valve is controlled by a first control signal and the proportional flow control valve is controlled by a second control signal from an electric output signal of the second steering member corresponding to an actuation of the second steering member. The output of the second steering member can be used as input for an Electronic Control Unit that will calculate the two control signals to be sent to the proportional flow valve and the second steering valve.

Particularly, the present invention can be employed, according to an aspect thereof, to steer the ground engagement elements of a work machine, for instance the front or back ground engagement elements or all such elements. The ground engagement elements can be wheels, tracks and the like. It may be possible that both the front and the back wheels of an excavator can be steered simultaneously in a coordinated-way when turning the steering wheel or operating the joystick. Further, work machines with tracks are usually steered differently than work machines with wheels in that for instance the left side track is moving counter-clockwise while the right side track is moving clockwise (or vice versa) or in that only one of the two tracks is moving while the other track is blocked. The mobile work machine can particularly be an excavator.

The first steering member can be e.g. a steering wheel and the second steering member can bean actuator on a joystick. The joystick steering can be arranged additional to the normal steering actuated by the first-steering member, e.g. a steering wheel. The first steering-member, however, can also be a joystick, a sliding actuator or the like. The present invention provides, according to an aspect thereof, a better control and comfort for the operator as well as improved safety and controllability of the steering function of the work machine.

Preferably, the first control signal can be an ON/OFF signal which can be, applied to the second steering valve responsive to the second steering member for selecting the steering direction. Particularly, the valve can comprise 3 positions, "left on", "right on", and "left and right off", which is expressed as "LEFT—ON/RIGHT—ON/OFF" describing in short form the three possible states of the valve "LEFT—ON" or "RIGHT—ON" or OFF". The second control signal can be a Pulse-Width-Modulation ("PWM") signal, or Pulse-Frequency-Modulation ("PFM") or Pulse-Step-Modulation ("PSM") which can be applied to the proportional flow control valve responsive to the second steering member for controlling a steering characteristic.

Favourably, the two valves can be controlled by two different electrical signals generated from a common signal source, i.e. the actuation of the second steering member. The second steering member can be a thumb slider, a thumb wheel, a hat switch (also called "mini joystick") which is operable with one's thumb. The second steering member may include a self-centering feature that brings the second steering member back in a neutral default position when not in operation or not being operated.

According to a further development of an aspect of the invention, the second steering valve and the proportional flow control valve can be connected in series with respect of the flow of the hydraulic fluid. The proportional flow control valve can be upstream to the second steering valve with respect to the hydraulic pump which provides the hydraulic pressure in the hydraulic system.

Particularly, the second steering valve can be a so called "4/3 way" valve, the expression "4/3 way" denoting a valve which has 4 fluid ports and 3 positions as known in the art. The second steering valve can be controlled with the help of one or more solenoids which switch the valve between the various positions.

The proportional flow control valve controls the amount of hydraulic fluid flow which is sent to the steering cylinders of the vehicle and can be controlled by an Electrical Control Unit ("ECU"), thus providing various possibilities of control characteristic, such as a smooth, aggressive, linear, nonlinear and the like steering movement as response to an actuation of the second steering member. By way of example, if the second steering member is a thumb slider the steering characteristic can react smoothly or aggressive or linear etc. to a sliding deflection of the thumb slider.

The combination of the second steering valve and the proportional flow control valve and their series connection yields an additional safety feature. As the two valves are controlled by different signal types, e.g. an ON/OFF signal in case of the second steering valve and for instance a PWM signal in case of the proportional flow control valve, the risk that a dangerous failure mode will have effect will be considerably decreased with the preferred series connection and electrical control of the second steering valve and the proportional flow control valve. Further, by designing the valves and their control logic in a fail-safe mode this risk will be decreased even further in that such design would block the hydraulic flow through a valve in case of failure of the valve concerned.

The steering valve and the proportional flow control valve can favourably form a valve unit which is connected in parallel to the first steering valve unit responsive to the first steering member. However, it is also possible to arrange them separately in different valve units. The important thing is that these two valves are operated in such a way that they are functionally operable in series with each other irrespective where they are physically located within the hydraulic steering circuit in the vehicle.

The second steering member can favourably be integrated in a joystick. Preferably, the second steering member can favourably be one of a thumb slider, thumb wheel, a hat switch being operable with one's thumb, arranged on an upper portion of the joystick. The joystick can be used to control a tool connected to the vehicle, e.g. excavator bucket. Thus, the steering can be controlled very sensibly by the operator while the operator is operating the tool of the vehicle.

A first pressure sensor can be connected to a hydraulic fluid load line between the priority valve and the first steering valve unit, wherein the pressure sensor output is coupled to the second steering member so that activation of the second steering member is controllable depending on an output signal of the pressure sensor.

Additionally, or alternatively, another second pressure sensor is connected to a hydraulic fluid load line between the priority valve and the first steering valve unit, wherein the pressure sensor output is coupled to the second steering member so that control signals applied to the second steering valve and/or the proportional flow control valve can be modulated according to the actual pressure signal measured by that other pressure sensor.

The first pressure sensor can particularly output a signal which can be an analogue input to the ECU controlling the priority valve. The pressure in the hydraulic fluid load line increases due to a movement, of the first steering member. If the first steering member is not in use, the pressure in the hydraulic fluid load line is low, e.g. on hydraulic tank pressure level. Therefore, the pressure signal of the first pressure sensor can be used to disengage the electrical signals to the second steering valve and to the proportional flow control valve when the first steering member is operated and the pressure signal of the first pressure sensor is changed accordingly, thus providing an additional electrical priority for the first steering member. This can be implemented as additional safety feature in a control routine of the vehicle.

Mechanical blocking or inhibition of the second steering member when the first steering member is operated can be provided as well but is usually not necessary.

Further, the electrical inhibition of the second steering unit is also made when the vehicle is in a mode of operation in which it is enabled to move and in which it could travel with a speed exceeding a certain (predefined) speed limit, for instance when travelling on a public road.

One advantage of an aspect of the invention is that the system is flexible and can operate or change its function without the necessity to make massive hardware design changes.

Based on virtually the same-hardware, i.e. the second steering valve unit, the invention, according to an aspect thereof, provides two different operational modes. As already described, the second steering member and the second steering valve unit can be employed to steer the ground engagement elements of a work when the first steering member is not engaged, according to the first operational mode.

In the second operational mode of an aspect of the invention; the second steering valve acts as a kind of servo unit for the first steering member. In this preferred alternative way of usage of the second steering valve unit, the pressure signal of the first and/or second pressure sensor can be used to modulate the electrical control signal to the second steering valve and the proportional flow control valve to change the reaction of the steering cylinder by adding a part of the total bypass flow of hydraulic fluid to the normal hydraulic fluid flow that the priority valve would give for the same pressure value on the hydraulic fluid load line. This feature can be considered as an automatic modulation (servo function) of the steering movement which modifies the necessary number of steering wheel turns to move the steering cylinder from one end to the other end. In case the first or second pressure sensor is used for this purpose, the second steering valve unit will not be, disengaged when the first steering member is operated. In this case it is advantageous to include a steering direction sensor which detects the steering direction in which the first steering unit is moved, i.e. if the vehicle is to be steered to the right hand side or the left hand side.

In order to distinguish the two alternative operational modes of, aspects of the invention, this alternative second operational mode of an aspect of the invention can be made selectable by the operator by e.g. an actuator such as a switch, a lever or the like, or a vehicle control unit can simply recognize the presence of the steering direction sensor or if the sensor is in its active operational state. Such a steering direction sensor can be present but is not necessary for the first above-described alternative operational-mode of an aspect of the invention. Advantageously, the second steering unit can be used in these two alternative ways even with virtually the same hardware.

Favourably, an ECU is provided for controlling the second steering valve and/or the proportional flow control valve.

According to another aspect of the invention, a method for controlling a hydraulic steering for a vehicle is proposed, comprising a first steering member operationally connected to a first steering valve unit and a second steering member, wherein a priority valve controls a flow of a hydraulic fluid to one or more steering cylinders which provide for steering the vehicle in a desired steering direction, wherein the priority valve gives priority to steering with the first steering member compared to the second steering member in case the first steering member is operated.

A second steering valve is provided functionally operable in series with a proportional flow control valve, wherein the second steering valve and/or the proportional flow control valve are/is controlled by the second steering member.

The control can favourably be achieved by an electrical signal or by a hydraulic pilot signal, or by an electromagnetic signal.

Favourably, a first control signal and a second control signal are extracted from an electric output, signal related to an actuation of the second steering member, wherein the first control signal controls the second steering valve and the second control signal controls the proportional flow control valve, wherein both the second steering valve and the proportional flow control valve are responsive to the second steering member.

Particularly, the present invention relates, according to an aspect thereof, to a method to steer the front or back wheels of a wheel excavator or (in a coordinated manner known in the art) both the front and back wheels via an actuator on a joystick. This joystick steering is additional to the normal steering actuated by the steering wheel.

The second steering valve can be controlled by an ON/OFF signal (particularly LEFT—ON/RIGHT—ON/OFF) for steering the vehicle in a desired steering direction. The proportional flow control valve can be controlled for instance by a Pulse-Width-Modulation ("PWM") signal for controlling a steering characteristic. Other types of modulation signals as for instance Pulse-Frequency-Modulation ("PFM") or Pulse-Step-Modulation ("PSM") signals can be used as well.

According to the first operational mode of an aspect of the invention, if a steering movement of the first steering member is detected, the pressure in a hydraulic fluid load line between the first steering valve and the priority valve increases. According to this increasing pressure, the priority valve directs the flow of a part of the hydraulic flow as a function of at least one pressure signal in the hydraulic fluid load line to the first steering valve, thereby enabling the steering of for instance the wheels of the excavator by operating the first steering member. Preferably, the steering priority valve is a proportional valve. The output of the valve is proportional to the need input from the first steering valve.

The second steering valve unit is electrically switched off if the pressure in the hydraulic fluid, load line is equal to or above a predetermined pressure limit.

Favourably, it can be ensured by these two features that the steering with the first steering member is prioritized.

If no steering action is performed with the first steering member, but a steering action of the second steering member is detected, the proportional flow control valve of the second steering valve unit can be triggered, wherein simultaneously the second steering valve is controlled to provide a desired steering direction indicated by a steering action of the second steering member.

In a preferred embodiment of an aspect of the inventions, the steering of the vehicle in the second operational mode and the speed of the vehicle are coupled with each other. Depending on the starting point, if the second operational mode is selected in a low gear of the vehicle transmission for which the use of the second operational mode is allowed, it is not possible to switch to a higher gear for which the use of the second operational mode is not allowed thereby effectively limiting the possible travel speed of the vehicle whereas if the vehicle travels with a speed above a certain speed limit (or if a gear of the vehicle transmission is engaged that allows such high speed), the second operational mode cannot be selected. Therefore, the travel speed of the vehicle is automatically limited to speed values below a certain upper speed limit when selecting a steering mode employing the second steering member. Thus it is not possible choose a travel speed of the vehicle which is higher than a certain speed limit simultaneously with the steering mode employing the second steering member.

Particularly, the safety of the vehicle can be improved if at least one of the following is given a high travel speed of the vehicle above a speed threshold value prevents selecting a steering mode employing the second steering member;

selecting a steering mode-employing the second steering member prevents a high travel speed of the vehicle-above a speed threshold value;

selecting a gear which is not compatible with the steering mode employing the second steering member prevents selecting a steering mode employing the second steering member;

selecting a steering mode employing the second steering member prevents selecting a gear which is not compatible with the steering mode employing the second steering member.

Favourably, the invention can be employed, according to an aspect thereof, in any vehicle or construction equipment comprising a hydraulic steering. The invention, according to an aspect thereof, is particularly useful for work machines such as wheel excavators.

The present invention is particularly applicable, according to an aspect thereof, for vehicles, particularly construction equipment, where (1) either the front or the back wheels are turned, or in a coordinated way even both the front and back wheels are turned like in wheeled excavators or the left hand side and right hand side tracks of crawler excavators etc., or where (2) the vehicle or construction equipment is articulated like a wheel loader or articulated hauler having wheels which can't be steered.

The present invention provides, according to an aspect thereof, the operator a higher comfort to control the mobile work machine during operation by providing the operator a steering control (i) which can be easily handled by the operator, (ii) which enables a smooth and proportional control of the steering speed, (iii) which increases the safety by providing diagnostic possibility for the device giving priority to steering, and (iv) which provides the option to implement additional features and functionalities by using an ECU and electronic control of a proportional hydraulic flow control valve additionally to a second steering valve.

BRIEF DESCRIPTION OF THE DRAWINGS

The present invention may best be understood from the following detailed description of the embodiments, but is not restricted to the embodiments, wherein is shown.

DETAILED DESCRIPTION

In the drawings, equal or similar elements are referred to by equal reference numerals. The drawings are merely schematic representations, not intended to portray specific parameters of the invention. Moreover, the drawings are intended to depict, only typical embodiments of the invention and therefore should not be considered as limiting the scope of the invention.

Figure 1:
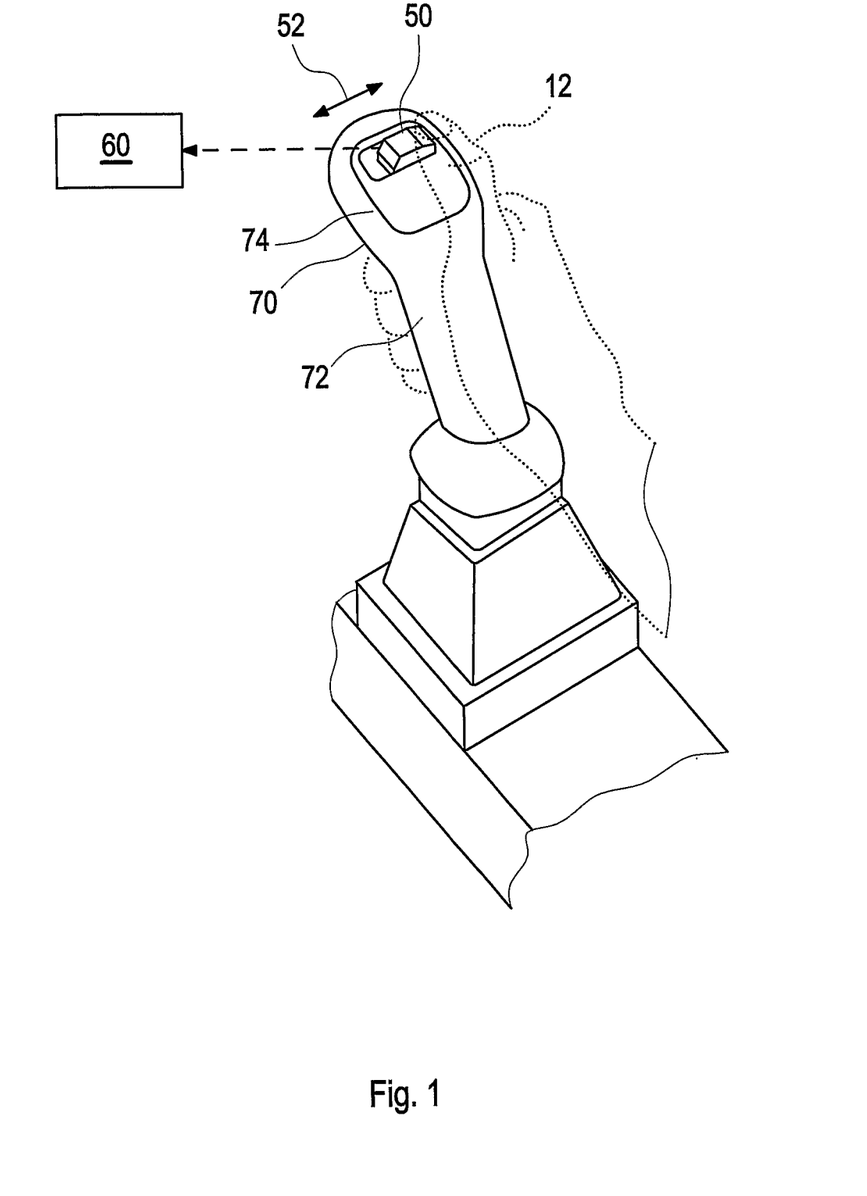
FIG. 1 a perspective view of a joystick comprising a second steering member according to a preferred embodiment of the invention.

The example embodiment in FIG. 1 shows in a perspective view a joystick 70 comprising a steering member 50 for steering a vehicle (210 in FIG. 2) such as a movable work machine according to a preferred embodiment of the invention. The vehicle 210 comprises ground engagement elements which are in the following example embodiments exemplified as wheels, but can be also crawler elements (tracks) and the like, but in, the following the vehicle is exemplified as a wheel excavator.

The round engagement elements of the vehicle are steered with a first steering element (steering element 10 in FIG. 2) having an impact onto a first valve unit (30 in FIG. 2) which by way of example is described in the following as steering wheel 10 but can also be a joystick, a slider or the like. Additionally, the vehicle provides a second steering member 50 mounted by way of example on the joystick 70 (see FIG. 1). The second steering member 50 is provided additionally to the first steering member 10 (FIG. 2), the first steering member 10 having priority regarding the steering of the ground engagement elements of the excavator over the second steering member 50. This means that only if the steering wheel 10 is not actively turned by the operator, the wheels of the excavator are responsive to a steering movement of the second steering member 50.

Figure 2:
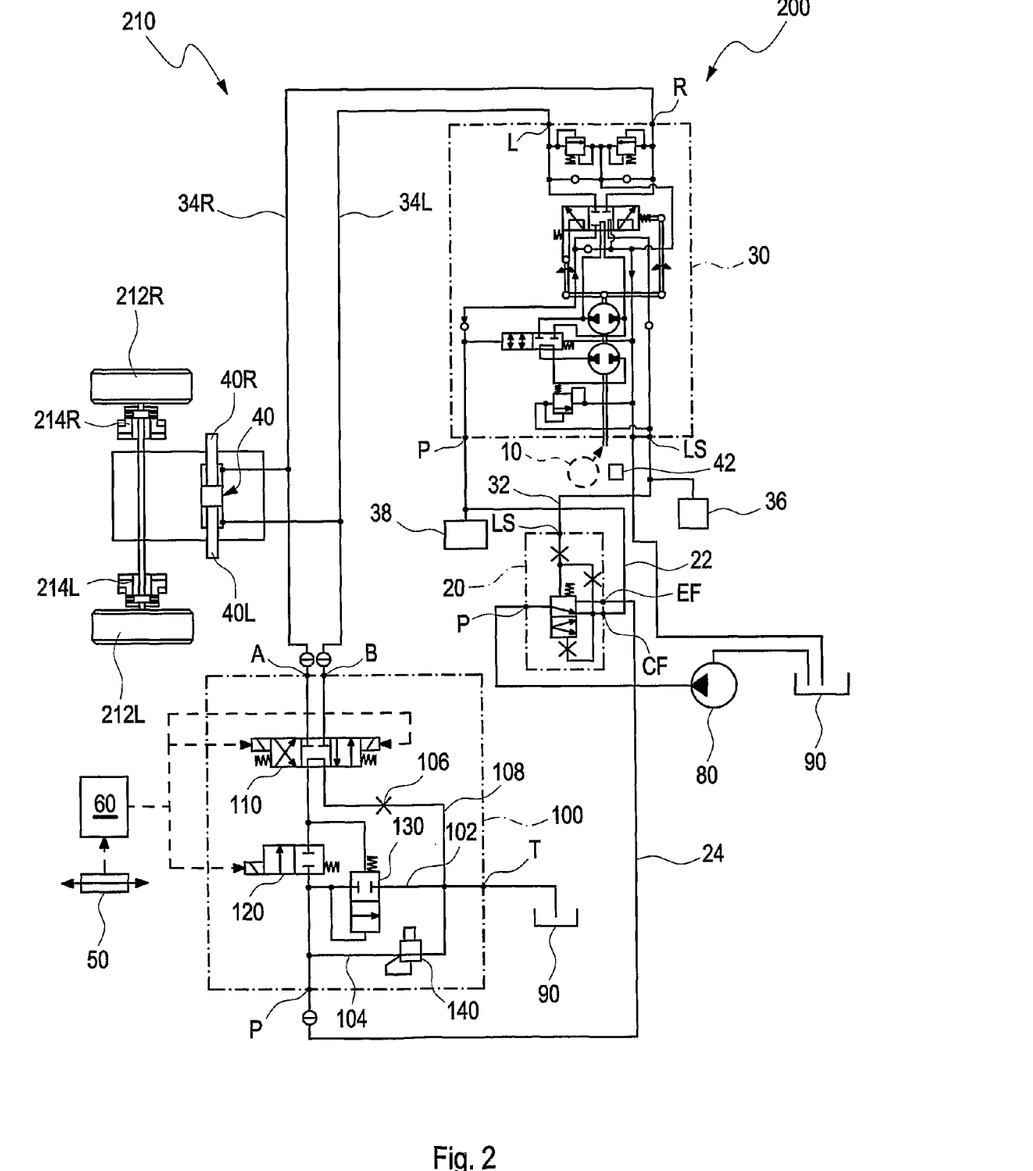
FIG. 2 a hydraulic diagram of a preferred hydraulic circuit incorporated in a vehicle according to the invention.

The actual position of the first steering member 10, e.g. a steering wheel, has no effect on the functioning of the invention since the first steering valve unit 30 does not make the steering wheel rotate (also known as "without feedback" type of steering unit). According to the first operational mode of the invention, the second steering member 50 can steer the ground engagement elements only if the first steering, member 10 is not in use.

Thus, in the preconditions described further below in relation to FIGS. 3 and 4, the vehicle (210 in FIG. 2) preferably can switch to the second steering member 50 (and in a preferred embodiment of the invention to a corresponding steering valve unit (100 in FIG. 2)) only when the vehicle (210 in FIG. 2) is in an allowed mode for doing so, e.g. a working mode/customer mode, and not in another mode such as a travel mode usually used for driving the vehicle (210 in FIG. 2) on public roads. Another preferred precondition (FIGS. 3, 4) is that the vehicle (210 in FIG. 2) is not in a selected "travel gear" that allows the vehicle (210 in FIG. 2) to exceed a speed threshold, e.g. 9 km/h. If the operator is using the second steering member 50, and switching the "travel gear" to high speed (up to 35 km/h), then the vehicle (210 in FIG. 2) will actually not switch to this high speed gear as long as the second steering member 50 is used.

The first and second steering members 10 (FIG. 2) and 50 are used for steering the wheels (e.g. the front or back wheels) of a wheel excavator. In such a wheel excavator one or more joysticks are usually used to control the movement of several parts or tools of the machine, e.g. excavator bucket, arm or boom arrangement. The operator is keeping his both hands on these joysticks while operating the excavator and these parts or tools in a working mode of the excavator (and not for instance in a travelling mode). Preferably, the second steering member 50 is integrated in one of these joysticks, so that the operator can use the steering function without removing his hands from the joysticks. As an example, in FIG. 1 it is shown how a hand of the operator engages comfortably in a lever 72 of such a joystick 70.

The second steering member 50 is arranged in the upper portion 74 of the lever 72 of the joystick 70 and can be easily moved by the operator's thumb 12 (preferably, as shown in the FIG. 1, bi-directionally in a first basic direction to the left or to the right seen from the operator). Alternatively, the second steering member 50 could be arranged at the joystick 70 in such a way that it is bi-directionally movable (i) in another basic direction vertical to the first basic direction and away from or towards to the operator or (ii) in any direction between the two aforementioned basic directions. By moving the second steering member 50 in FIG. 1 to the left or right direction seen from the operator, the wheels of the wheel excavator turn in the left of right direction correspondingly thereby advantageously enabling the operation of said additional steering member in an intuitive manner for the operator, e.g. a movement of the steering member to the left causes the excavator wheels turning to the left as well, and vice versa for the movement to the right.

Steering can be achieved by converting the actuation of the second steering member 50, e.g. a sliding movement for a thumb activated slider within its frame or a rotation for a thumb activated wheel, for instance into an electric signal which is transmitted to an ECU 60. The activation of the second steering member 50 is indicated in FIG. 1 by a double sided arrow 52. The speed into which the steering angle of the wheels of the excavator will change compared to their straight forward position is a function of the amplitude of the displacement of the slider from its neutral position in the middle of the slider frame. This function can be a linear function or any other non-linear and monotonous function. For instance, sliding a thumb slider from one end of the slider frame via the neutral position to the other end of the frame (such a typical displacement could be ±1 cm around the neutral position in the middle of the frame) could—depending on the selected control function—cause a corresponding rotational steering movement between two extreme positions of the wheels of the excavator (corresponding to having the wheels of the excavator turned to, their maximum left or right inclination compared with their straight position).

FIG. 2 displays a hydraulic diagram of a preferred hydraulic circuit of a vehicle 210 (only roughly indicated by two wheels 212R, 212L and a hydraulic steering system 200) according to the invention. The vehicle 210 could be, any kind of vehicle such as a construction equipment or construction vehicle as for instance a wheel excavator. For simplicity, in the following it is assumed that said vehicle 210 is a wheel excavator.

A first steering device 10 exemplified in the following (as already mentioned above) as a steering wheel, displayed in a simplified manner, is in operational connection to a first steering valve unit 30, comprising a first steering valve (not specified in detail) and other components. The steering valve unit 30 is a conventional device generally known in the art and therefore not discussed in detail. Every such conventional device known in the art can be employed which allows for steering the wheels with hydraulic components.

As known in the art, activation of the first steering device 10, e.g. turning the steering wheel, by the operator of the excavator 210 causes a corresponding hydraulic fluid to flow in one of the hydraulic fluid lines 34L or 34R thus providing, hydraulic energy to the respective side 40R or 40L of a steering cylinder 40 resulting in an appropriate turning, of the respective wheel 212L, 212R either clockwise or counter-clockwise. The wheels 212L, 212R may be provided with wheel brakes 214R, 214L for securing the wheels 212L, 212R during working operations of the excavator 210. The hydraulic fluid is pressurized by a pump 80 as known in the art, e.g. up to 200 bar. For releasing the hydraulic pressure, hydraulic fluid is discharged in a hydraulic tank 90 operated at a low pressure, e.g. at 2 bar or at atmospheric pressure. The pump 80 is connected to the tank 90 via a fluid line.

A priority valve 20 is arranged between the pump 80 and the steering valve unit 30. The pump 80 is connected to a pump port P of the priority valve 20. The priority valve 20 is connected to the first steering valve unit 30 (i) by a hydraulic fluid load line 32 between port LS of the priority valve 20 and a similar port LS of the steering valve unit 30 and (ii) by a pump, line 22 between port CF of the priority valve 20 and a port P of the first steering valve unit 30. A pressure switch 38 is used to warn the operator in case the pressure at port P of the first steering valve unit 30 would be lower than a pre-determined value, e.g. 5 bar, indicating a malfunction of the hydraulic fluid supply, e.g. hydraulic oil, from the pump 80.

The priority valve 20 and thus the first steering valve unit 30 are both responsive to a steering action of the first steering member 10.

A pressure sensor 36 is attached to the hydraulic fluid load line 32 between port LS of the priority valve 20 and the corresponding port LS of the first steering valve unit 30.

The priority valve 20 is connected with its port EF via hydraulic line 24 to a port P of a second steering valve unit 100 which has further ports A and B. Port A connects the second steering valve unit 100 to the right port (right hand side 40R) of the steering cylinder 40 for turning the wheels 212 R and 212L to the right (clockwise seen from above) and port B connects the second steering valve unit 100 to the left port (left hand side 40L) of the steering cylinder 40 for turning the wheels 212 R and 212L to the left (counter-clockwise seen from above).

The second steering valve unit 100 comprises a steering valve 110 (hereinafter for clarity reasons referred to as "second steering valve 110" in order to distinguish it from the corresponding "first, steering valve" contained in the first steering valve unit 30) and a proportional flow control valve 120 connected in series with the second steering valve 110 with respect to the hydraulic fluid connection. In this embodiment both the second steering valve 110 and the proportional flow control valve 120 are directly connected in series with each other and are both contained in said second steering valve unit 100. However, it is also possible to have them arranged separately from each other provided they are functionally operable in series.

The proportional flow control valve 120 can be arranged also in another design, which e.g. could make the valves 110, 120, as well as a pressure balance 130 in line 102 and a pressure relief valve 140 in line 104 be connected as separate components.

The steering valve 110 is a 4/3 way valve which (i) in a first—middle—position (as shown in FIG. 2) blocks the flow of the hydraulic fluid, (ii) in a second position gives way to the fluid flow towards the respective sides 40R and 40L of the steering cylinder 40 in one direction, and (iii) in a third position reverses the fluid flow direction to the respective sides 40R and 40L of the steering cylinder 40, thus providing turning the wheels 212R and 212L of the wheel excavator 210 to the right side or the left side and thereby enabling moving the excavator 210 to the right side or the left side.

The proportional flow control valve 120 can be bypassed by excess hydraulic fluid via the pressure balance 130 in line 102 which is activated by hydraulic fluid from in between the proportional flow control valve 120 and the second steering valve 110 and which leads the hydraulic fluid via a port T to a tank which preferably is the same tank 90 that is connected to the first steering valve unit 30. The proportional flow control valve 120 is protected from overpressure by the pressure relief valve 140 in line 104. The return line 108 connecting the second steering valve 110 to the hydraulic tank 90 comprises a throttle element 106 which maintains a certain back pressure when hydraulic fluid, e.g. hydraulic oil, is flowing out from the respective side 40R or 40L of the steering cylinder 40 which prevents unwanted movements when the ground engagement elements 212R and 212L are moving.

The second steering valve 110 and the proportional flow control valve 120 are electrically controlled by an ECU 60 (the ECU 60 depicted in FIG. 1).

Both the first steering valve (contained in the first steering valve unit 30) and the second steering valve 110 (contained in the second steering valve unit 100) are connected via the hydraulic fluid lines 34L and 34R to the respective sides 40L and 40R of the steering cylinder 40, the first steering valve via the ports L and R of the first steering unit 30 and the second steering valve 110 via the ports A and B of the second steering valve unit 100.

The operational state of the priority valve 20 decides how much of the hydraulic fluid flow coming from the pump 80 will be sent to the conventional steering valve of the first steering valve unit 30, connected to port CF of the priority valve 20, the rest of the hydraulic fluid flow coming from the pump 80 being sent to the second steering valve 110 of the second steering valve unit 100, connected to port EF of the priority valve 20.

The hydraulic system 200 can be used in two alternative operational modes.

According to the first operational mode, the second steering valve unit 100 can be used only when the first steering member 10—which is functionally connected to the first steering valve unit 30—is not operated, thereby establishing a favourable safety feature.

According to the second alternative operational mode, the second steering valve unit 100 can be used simultaneously with the first steering valve unit 30 when the first steering member 10 is operated.

In this latter case the second steering valve 110 can advantageously be used for "modulating" the steering speed as a kind of servo unit, e.g. amplifying or supporting the steering movement of the first steering member (the steering wheel 10 in FIG. 2). The so called "modulation" of the steering where both the first and second steering valve units 30 and 100 are operative is handled automatically by the system while the operator is only operating the first steering member, i.e. turning the steering wheel 10. The operation of the second steering member 50, i.e. the slide 50 at the joystick 70, by the operator in parallel to his operation of the steering wheel 10 is even in this steering modulation mode (i.e. the second operational mode) inhibited or without any effect onto the actual steering operation. The state of activation of the second steering valve unit 100 can be preferably made by a computing system and can be independent from the actual position of the second steering member 50. In practice, the movement of the first steering member 10 will generate a corresponding output signal of a pressure sensor 36 connected to line 32 which can be used (for instance via the ECU 60 in FIG. 1) to change the state of the second steering valve unit 100. The direction of activation of the second steering valve 110 could be based on the output signal of a sensor 42 which could be a mechanical sensor or Hall sensor arranged at the steering column or steering axle connected with the steering wheel 10. The proportional signal sent to the proportional flow control valve 120 could be based on the output signal of the pressure sensor 36.

In the first operational mode of the hydraulic system according to the invention, where steering can be performed by the second stetting member 50, two operational states can be distinguished.

1. In the first operational state used within the frame of the first operational mode of the hydraulic system according to the invention the steering wheel 10 is subject to a steering movement by an operator. In this case, the pressure in the hydraulic fluid load line 32 between the conventional (first) steering valve unit 30 and the priority valve 20 increases. The priority valve 20 switches the hydraulic fluid flow to the conventional (first) steering valve unit 30 proportional to the actual pressure in the hydraulic fluid load line 32. The pressure increase is detected by the pressure sensor 36.

In a first embodiment of the invention (used within the frame of the first operational mode of the hydraulic system according to the invention), a sensor signal of the pressure sensor 36 indicating a pressure increase in hydraulic fluid load line 32 causes switching off of the second steering valve, unit 100 by electrically switching off of the solenoid arrangement which controls said valve unit 100, i.e. of the second steering valve 110 by moving it into its first—middle—position (as shown in FIG. 2) which (i) connects the outlet of the proportional flow control valve 120 through the line 108 to the tank 90, and (ii) blocks the connections to the ports A and B. The proportional flow control valve 120 will be switched off as well, so that the hydraulic fluid flow will be discharged to the tank 90 through the valve 130 and line 102 under low pressure, e.g. 7 bar. Thus, two conditions are available to ensure that steering with the first steering member 10 (e.g. the steering wheel) is prioritized over steering with the secondary steering member 50 mounted e.g. on the joystick 70 (FIG. 1).

Both valves 110, 120 of the second steering valve unit 100 should preferably be switched off at the same time. If only the proportional flow control valve 120 is switched off, one side (40L or 40R), i.e. one of the hydraulic fluid lines (34L or 34R), would still be connected to tank 90 through the second steering valve 110 which is a situation that is not preferred because it is not possible to steer with the steering wheel 10 in the opposite direction. If only the second steering valve 110 is switched off, the hydraulic fluid flow through the proportional flow control valve 120 will be discharged through the throttle 106 and line 108 to the tank 90 which is a situation that is not preferred either because this discharge causes an unwanted loss of energy.

2. In the second operational state (used, within the frame of the first operational mode of the hydraulic system according to the invention), the first steering member 10, e.g. the steering wheel, is not subject to any steering movement, but the second steering member 50 is operated by the operator. In this case, the proportional flow control valve 120 of the second steering valve unit 100 is connected to the port EF of the priority valve 20 and supplied with hydraulic fluid at high pump pressure at its port P.

Both the second steering valve 110 and the proportional flow control valve 120 are controlled by the ECU 60 which receives (i) a pressure signal from the pressure sensor 36 indicating that the first steering member 10 is inactive, i.e. not operated by the operator of the excavator, as well as (ii) an electric signal corresponding to the steering actuation of the second steering member 50 at the joystick 70 of the excavator 210. Thus, both the second steering valve 110 and the proportional flow control valve 120 of the second steering valve unit 100 are electrically switched on and can receive further electric control signals from the ECU 60.

Simultaneously, the second steering valve 110 of the second steering valve unit 100 is moved into one of the two positions other than the middle position, depending on the desired direction of turning of the wheels 212R and 212L of the excavator 210 and correspondingly controlled by the ECU 60. A LEFT—ON/RIGHT—ON/OFF-signal for the selection of the direction of steering of the second steering valve 110 and a PWM signal (pulse width modulation signal) for controlling the proportional flow control valve 120 are extracted from the same electric signal generated by the second steering member 50. The LEFT—ON/RIGHT—ON/OFF-signal indicates the direction of steering, i.e. whether the left or the right side 40L or 40R of the steeling cylinder 40 is to be loaded. The second steering valve 110 thus is moved to the second or third position according to the LEFT—ON/RIGHT—ON/OFF signal.

When the second steering member 50 is moved in a way away from its middle ("neutral") position, the wheels 212R, 212L should be turned clockwise (i.e. to the right in FIG. 1 seen from above). Keeping this in mind an ON signal" means that a corresponding ON-signal is created in order to move the second steering valve 110 to the respective position giving way to the hydraulic fluid to flow to one of the two sides 40R or 40L of the steering cylinder 40 and to flow back from the other one of the sides 40L or 40R of the steering cylinder 40, respectively. When the second steering member 50 is moved in a way that the wheels 212R. 212L should be turned counter-clockwise (i.e. to the left seen from above), the second steering valves 110 is moved to the respective other position providing the reverse flow of hydraulic fluid.

The "OFF signal" corresponds to a situation where there is no "ON signal" for the left and for the right solenoids of the second steering valve 110, thus letting the valve in its middle position (spring centred). More particularly, in case of no RIGHT—ON signal and no LEFT—ON signal the valve 110 remains in its middle position. In case of RIGHT—ON signal (and LEFT—OFF signal) the valve 110 moves to the corresponding outer position of the two possible outer positions. In case of LEFT—ON signal (and RIGHT—OFF signal) the valve 110 moves to the corresponding other outer position of the two possible outer positions.

The second steering member 50, e.g. embodied as a thumb slider, has preferably three different statuses: neutral when placed in the middle of the slider frame, corresponding to the middle position of the second steering valve 110, and a left turning status when sliding to the left, corresponding to the left position of the second steering valve 110, and a right turning position when sliding to the right, corresponding to the right position of the second steering valve 110. The output signals corresponding to these three statuses of the second steering member 50 will be always available in a basic version of the invention since the operator is able to mechanically move the second steering member 50 in the slider frame even if the operator is operating the steering wheel 10 at the same time. However, the ECU 60 makes sure that these output signals will have no effect onto the second steering valve unit 100, i.e. that the two valves 110 and 120 incorporated therein, are all switched off if the steering wheel 10 is operated.

The PWM signal indicates a steering characteristic, particularly the steering speed, e.g. how fast the wheels 212L and 212R of the excavator shall be turned. This signal is proportional to the deflection of the second steering member 50, e.g. proportional to the lateral movement of a thumb slider to the right or left side of the neutral position in the middle of the slider frame or, in an alternative embodiment, to the rotational movement of a thumb wheel. Thus the proportional flow control valve 120 only transmits an amount of hydraulic fluid flow to the second steering valve 110 proportional to the degree of actuation of the second steering member 50. A surplus of hydraulic energy, i.e. hydraulic fluid is discharged by the pressure balance 130 and through the line 102 to the hydraulic tank 90.

In a second, embodiment of the invention (used within the frame of the second, operational mode of the hydraulic system according to the invention), the pressure sensor 36 can be used to provide a modulation of the steering speed when the hydraulic system 200 is in its first operational state.

When the first steering member 10 is operated (first operational state), the priority valve 20 will supply the required hydraulic fluid flow coming from the pump 80 to the first steering valve 30 depending on the pressure level measured by the pressure sensor 36 on the hydraulic fluid load line 32. In this case, the excess hydraulic fluid flow coming from the pump 80 will be sent to the second steering valve 110 through the port EF of the priority valve 20.

Alternatively to the first embodiment of the invention described above, in which the second steering valve unit 100 is disengaged in the first operational state, and thus the excess hydraulic fluid flow is discharged to the tank 90, in the second embodiment, this excess hydraulic fluid flow can be used to bring an additional hydraulic fluid flow to the steering cylinder 40 via the second steering valve unit 100 when the first steering member 10 is operated.

The signal to the proportional flow control valve 120 will be in relation to the pressure value detected by the pressure sensor 36. The additional sensor 42, e.g. a mechanical sensor or Hall sensor mounted for instance at the steering column or steering axle (FIG. 2) can give the operational direction of the first steering member 10 (LEFT or RIGHT), to allow the proper control signal (LEFT—ON, RIGHT—ON) to be sent to the second steering valve 110.

In a further development, the steering sensor 42 can be used to detect the steering direction and the speed of operation of the first steering member 10. In this case, the pressure value detected by the pressure sensor 36 can advantageously be replaced by the speed value detected by the steering sensor 42 as input to control the proportional flow control valve 120.

Figure 3:
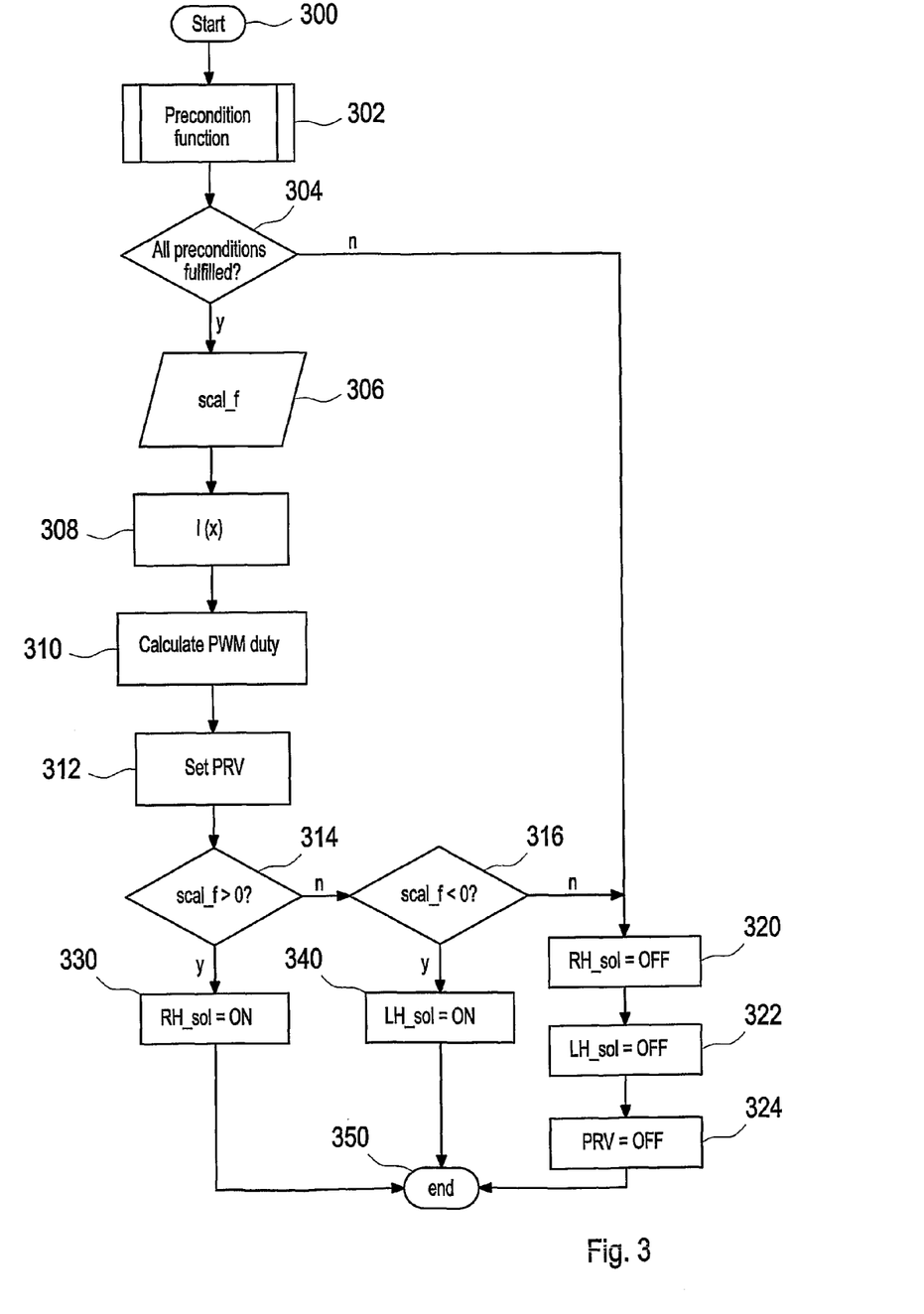
FIG. 3 a flow chart depicting the effect of engaging and disengaging of a second steering member according to the invention.

FIG. 3 shows a flow chart depicting a routine, corresponding to the first embodiment of the invention, for disengaging the second steering member 50 (FIG. 1) thus giving priority to the first steering member 10 (FIG. 2) as described in the precedent FIGS. 1 and 2. This routine is advantageously executable in an ECU (60 in FIG. 1).

The routine starts at step 300. In the subsequent subroutine "Precondition function" in step 302, preconditions for activating the second steering-valve unit 100 (FIG. 2) are checked. Preferably, preconditions are e.g. that the engine of the excavator (or, more general, the vehicle) is running and/or a hydraulic fluid is available at a sufficient pressure and the first steering member 10 is not operated in a steering action. Further preconditions can be that an allowed operation mode is selected for the excavator/vehicle, if one or more of such an operation mode in the excavator/vehicle control is provided, e.g. an operation mode in which for instance the excavator bucket of the wheel excavator is active. A further precondition can be that an allowed travel control mode is active, provided that such a travel mode is provided in the excavator/vehicle control. Further, other safety and/or security devices which should be active can also be considered as precondition, e.g. a control lockout lever which has to be in a particular position if the operator is in the excavator/vehicle. Further, a precondition to be fulfilled can be the engagement of a certain gear of the vehicle transmission or a speed below a maximum speed limit of the vehicle, above which the steering of the wheels is only possible by the steering wheel 10 and not by the second steering member 50. If one of the preconditions is not fulfilled, the electrical output signal of the second steering member 50 will still be sent to the ECU 60. However, the ECU 60 decides in this case, to disable or inhibit the second valve unit 100.

If all actually given preconditions are fulfilled, an appropriate flag can be set in the ECU 60, e.g. this flag control signal is set to 1 if all preconditions are fulfilled and to 0 if one or more of these preconditions are not fulfilled.

In step 304 it is checked if all preconditions are fulfilled. If not (indicated by "n" in the Figure), then all outputs of the second steering valve unit 100 are shut off. Thus in steps 320, 322, 324 the valves 110, 120 are disabled. More in detail, in step 320, the solenoid (RH_sol in FIG. 3) of the right hand side of the second steering valve 110 is electrically switched off, causing the spool of the second steering valve 110 to go back into neutral position thanks to the spring located on the opposite side. In step 322 the solenoid (LH_sol in FIG. 3) of the left hand side of the second steering valve 110 is electrically switched off, causing the spool of the second steering valve 110 to go back into neutral position thanks to the spring located on the opposite side, and in step 324 the solenoid (PRV in FIG. 3) of the proportional flow control valve 120 is electrically switched off, causing the spool of the proportional flow control valve 120 to go back in its closed position thanks to the spring located on the opposite side of the spool, and the routine ends in step 350.

If in step 304 all preconditions which have to be fulfilled (indicated by "y" for step 304 in the Figure) are fulfilled, a scaling factor of the second steering valve unit 100 is defined in step 306 as the value in accordance with the actual position of the second steering member 50 (FIG. 1). This is done only if the signal from the second steering member 50 indicates a position of the second steering member 50 other than its neutral position (x=0). In this embodiment it is a 1:1 relationship between the position of the second steering member 50 on one side and the signal from said second steering member 50 on the other side, i.e. if x≠O, then the signal ≠O.

In step 308 a characteristic current curve 1(x) is read out from a memory, corresponding to a pre-determined relation between the actual position x of the second steering member 50 and the current I that will be calculated by the ECU, e.g. in form of a linear, non-linear or monotonous function. In step 310 a PWM duty is calculated from the selected 1(x) proportional to the scaling factor scal_f. In step 312 an output signal (Set PRY) is sent by the ECU to the proportional flow control valve 120 according to the resulting PWM duty.

In step 308 a characteristic current curve 1(x) is read out from a memory, corresponding to a pre-determined relation between the actual position x of the second steering member 50 and the current I that will be calculated by the ECU, e.g. in form of a linear, non-linear or monotonous function. In step 310 a PWM duty is calculated from the selected 1(x) proportional to the scaling factor scal_f. In step 312 an output signal (Set PRV) is sent by the ECU to the proportional flow control valve 120 according to the resulting PMW duty.

In step 314 it is decided if the scaling factor scal_f is >0. If the answer is no (indicated by "n" for step 314 in the Figure), it is decided in step 316 if the scaling factor scal_f is <0. If this answer is no either (indicated by "n" for step 316 in the Figure), the aforementioned steps 320, 322, 324 are performed and the second steering valve unit 100 is disabled. In this case the scaling factor scal_f=0. The routine ends in step 350.

If the scaling factor scal_f is <0 (indicated by "y" for step 316 in the Figure), then the left hand side solenoid (LH_sol) of the second steering valve 110 is switched on in step 340, i.e. the left hand side 40L of the steering cylinder 40 is loaded. If the scaling factor scal_f is >0 (indicated by "y" for step 314 in the Figure), then the right hand side solenoid (RH_sol) of the second steering valve 110 is switched on in step 330, i.e. the right hand side 40R of the steering cylinder 40 is loaded. The routine ends in step 350.

Figure 4:
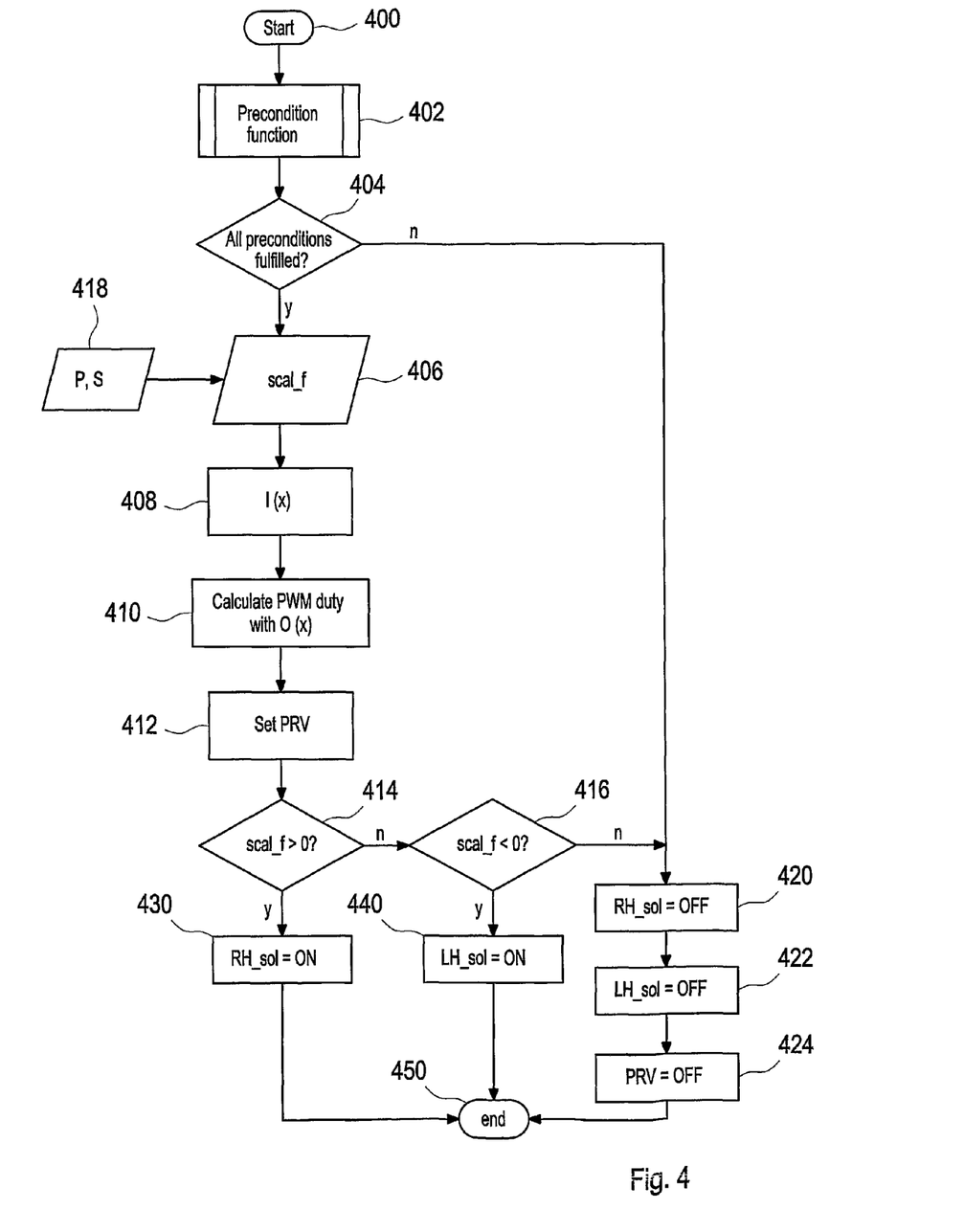
FIG. 4 a flow chart depicting the modulation of the steering effect of a first steering member caused by a second steering member according to the invention.

FIG. 4 shows a flow chart depicting a routing corresponding to the second embodiment of the invention, for using the second steering unit (100 in FIG. 2) as a modulation device of the steering speed when operating the first steering member (steering wheel 10 in FIG. 2).

The pressure sensor 36 (FIG. 2) can be used to control the signal to be provided to the proportional flow control valve 120, and a direction sensor 42 (FIG. 2) can be used to control the signal to be provided to the second steering valve 110.

In a further development, the sensor 42 can be used as well to know the exact speed of operation of the first steering member 10, and thus to provide a more accurate control of the additional hydraulic fluid flow to be sent to the steering cylinder 40 through the proportional flow control valve 120.

The routine starts at step 400. In the subsequent subroutine "Precondition function" in step 402, preconditions for activating the second steering valve unit 100 (FIG. 2) are checked. Preferably, preconditions are that the engine of the excavator (or, more general, the vehicle) is running and/or a hydraulic fluid is available at a sufficient pressure and the first steering member 10 is not operated in a steering action. Further preconditions can be that an allowed operation mode is selected for the excavator/vehicle if one or more of such an operation mode in the excavator/vehicle control is provided, e.g. an operation mode in which for instance the excavator bucket of the wheel excavator is active. A further precondition can be that an allowed travel control mode is active, provided that such a travel mode is provided in the excavator/vehicle control. Further, other safety and/or security devices which should be active can also be considered as precondition, e.g. a control lockout lever which has to be in a particular position if the operator is in the excavator/vehicle. Further, a precondition to be fulfilled can be the engagement of a certain gear of the vehicle, transmission or a speed below a maximum speed limit of the vehicle, above which the steering of the wheels is only possible by the steering wheel 10 and not by the second steering member 50. If one of the preconditions is not fulfilled, the electrical output signal of the second steering member 50 will still be sent to the ECU 60. However, the ECU 60 decides in this case to disable or inhibit the second valve unit 100.

If all actually given preconditions are fulfilled, an appropriate flag can be set in the ECU 60, e.g. this flag control signal is set to 1 if all preconditions are fulfilled and to 0 if one or more of these preconditions are not fulfilled.

In step 404 it is checked if all preconditions are fulfilled. If not (indicated by "n" for step 404 in the Figure), then all outputs of the second steering valve unit 100 are shut off. Thus in steps 420, 422, 424 the valves 110, 120 are disabled. More in detail, in step 420, the solenoid (RH_sol in FIG. 4) of the right hand side of the second steering valve 110 is electrically switched off, causing the spool of the second steering valve 110 to go back into neutral position thanks to the spring located on the opposite side. In step 422 the solenoid (LH_sol in FIG. 4) of the left hand side of the second steering valve 110 is electrically switched off, causing the spool of the second steering valve 110 to go back into neutral position thanks to the spring located on the opposite side, and in step 424 the solenoid (PRV in FIG. 4) of the proportional flow control valve 120 is electrically switched off, causing the spool of the proportional flow control valve 120 to go back in its closed position thanks to the spring located on the opposite side of the spool, and the routine ends in step 450.

If in step 404 all preconditions which have to be fulfilled are fulfilled (indicated by "y" for step 404 in the Figure), then in step 406 a scaling factor scal_f of the second steering valve unit 100 is defined as the value in accordance with the position of the second steering member 50 (FIG. 1) if it is used by the operator, or as the value in accordance to the pressure value P from the pressure sensor 36 (FIG. 2) and the direction of steering S (LEFT or RIGHT) from the first steering member sensor 42 if the first steering member 10 (FIG. 2) is used by the operator. In step 418, P and S signals are delivered as input to step 406.

In a further development, the scaling factor scal_f can be calculated as well based on the value of the speed of actuation of the first steering member (10 in FIG. 2).

In step 408 a characteristic current curve 1(x) is read out from a memory, corresponding to a pre-determined relation between the value scal_f and the current I that will be calculated by the ECU, e.g. in form of a linear, non-linear or monotonous function. In step 410 a PWM duty is calculated from the selected 1(x). In step 412 an output signal (Set PRV) is sent by the ECU to the proportional flow control valve 120 according to the resulting PWM duty value O(x), O(x) is a characteristic function that modifies the PWM duty (in %) for a given curve 1(x) and the scaling factor scal_f, wherein the scaling factor scal_f can vary dependent on the pressure value P from the pressure sensor 36 (FIG. 2) and the direction of steering S, in contradistinction to the calculation of the PWM duty according to the embodiment of FIG. 3. The "duty" means the percentage of "current" versus no current" in one cycle (100% duty means full current).

In step 414 it is decided if the scaling factor scal_f is >0. If the answer is no (indicated by "n" for step 414 in the Figure), it is decided in step 416 of the scaling factor scal_f is <0. If this answer is no either (indicated by "n" for step 416 in the Figure), the aforementioned steps 420, 422, 424 are performed and the second steering valve unit 100 is disabled. In this case the scaling factor scal_=0. The routine ends in step 350.

In step 414 it is decided if the scaling factor scal_f is >0. If the answer is no (indicated by "n" for step 414 in the Figure), it is decided in step 416 of the scaling factor scal_f is <0. If this answer is no either (indicated by "n" for step 416 in the Figure), the aforementioned steps 420, 422, 424 are performed and the second steering valve unit 100 is disabled. In this case the scaling factor scal_f=0. The routine ends in step 350.

If the scaling factor scal_f is <0 (indicated by "y" for step 416 in the Figure), then the left hand side solenoid (LH_sol) of the second steering valve 110 is switched on in step 440, i.e. the left hand side 40L of the steering cylinder 40 is loaded. If the scaling factor scal_f is >0 (indicated by "y" for step 414 in the Figure), then the right hand side solenoid (RH_sol) of the second steering valve 110 is switched on in step 430, i.e. the right hand side 40R of the steering cylinder 40 is loaded. The routine ends in step 450.

The system and the method proposed for controlling a hydraulic steering system 200 is favourably improving the comfort of the operator when using a vehicle such as a movable work machine where two steering systems are used e.g. one during travelling and the other one during operation of a tool of the work machine or at travelling speeds below a predetermined maximum speed of the vehicle.

The invention is not limited to the embodiments described above. For instance, the hydraulic circuit described in FIG. 2 could easily be adapted to an application for an articulated vehicle (for instance a wheel loader or articulated hauler) where the wheels of the vehicle are not turned but the whole part of the vehicle in relation to its back part. In this case the steering cylinder 40 would not be used to steer the (front or back) wheels of the vehicle; they would be used to articulate one part of the articulated vehicle (for instance the front part with the front wheels) relative to the other part of the vehicle (here: the back part of the vehicle with the back wheels) causing a movement of the whole vehicle either to the left or to the right.

Further, the hydraulic steering in FIG. 2 could be used to steer more than one steering cylinder 40. For instance, this embodiment could be further developed to steer two or more of such steering cylinders, each one steering one wheel of a vehicle equipped with four wheels (two in the front and two in the back of the vehicle) or six wheels (for instance two in the front and four in the back of the vehicle) whereby the steering processes of each of the wheel are coordinated in an appropriate way (by one or more ECU) to enable the desired overall movement of the vehicle in an optimum manner.

The invention claimed is:

1. A hydraulic steering system for a vehicle, comprising a first steering member and a second steering member, wherein the first steering member is operationally connected to a first steering valve unit comprising a first steering valve, and wherein a priority valve controls a flow of a hydraulic fluid to one or more steering cylinders which provide for steering of the vehicle in a desired steering direction, wherein the priority valve gives priority to steering with the first steering member over steering with the second steering member, wherein a second steering valve unit is provided comprising a second steering, valve, wherein the priority valve is connected to the second steering valve unit by a hydraulic fluid load line, and the second steering valve is functionally operable in series with a proportional flow control valve with respect to the hydraulic fluid load line, wherein in a first operational mode when the first steering member is not operated the second steering valve and/or the proportional flow control valve are controlled at least by the second steering member and in a second operational mode the second steering valve unit and the first steering valve unit are used simultaneously when the first steering member is operated.

2. The steering system according to claim 1, wherein the second steering valve is controlled by a first control signal and the proportional flow control valve is controlled by a second control signal corresponding to an actuation of the second steering member, and whereby first control signal, second control signal and output signal of the steering member preferably is one of an electric signal or hydraulic pilot signal or electromagnetic signal.

3. The steering system according to claim 2, wherein the first control signal is an ON/OFF signal which can be applied to the second steering valve responsive to the second steering member for selecting the steering direction.

4. The steering system according to claim 2, wherein the second control signal is one of a PWM-signal, PFM-signal or PSM-signal which can be applied to the proportional flow control valve responsive to the second steering member for controlling a steering characteristic.

5. The steering system according to claim 1, wherein the second steering valve and the proportional flow control valve are connected in series with respect of the flow of the hydraulic fluid.

6. The steering system according to claim 1, wherein the second steering valve and the proportional flow control valve form a valve unit which is connected in parallel to the first steering valve unit which in turn is responsive to the first steering member.

7. The steering system according to claim 1, wherein the second steering member is integrated in a joystick.

8. The steering system according to claim 7, wherein the second steering member is one of a thumb slider, thumb wheel, a hat switch being operable with one's thumb, preferably arranged on an upper portion of the joystick.

9. The steering system according to claim 1, wherein a pressure sensor is connected to a hydraulic fluid load line between the priority valve and the first steering calve unit, wherein the pressure sensor is coupled to the second steering member so that activation of the second steering unit is controllable depending on an output signal of the pressure sensor.

10. The steering system according to claim 1, wherein a pressure sensor is connected to a hydraulic fluid load line between the priority valve and the first steering valve unit, wherein the pressure sensor is coupled to the second steering member so that control signals applied to the second steering valve and/or the proportional flow control valve can be modulated according to the actual pressure signal.

11. The steering system according to claim 1, wherein an electronic control unit is provided for controlling the second steering valve and/or the proportional flow control valve.

12. The steering system according to claim 1, wherein a steering sensor is provided for sensing a steering direction and/or a speed of operation of the first steering member.

13. A vehicle comprising a hydraulic steering system according to claim 1.

14. A method for controlling a hydraulic steering, system for a vehicle, comprising
providing a first steering member operationally connected to a first steering valve unit and a second steering member,
controlling, via a priority valve, a flow of a hydraulic fluid to one or more steering cylinders which provide for steering the vehicle in a desired steering direction, wherein the priority valve gives priority to steering with the first steering member over steering with the second steering member,
providing a second steering valve unit comprising a second steering valve, wherein the priority valve is connected to the second steering valve unit by a hydraulic fluid load line, and the second steering valve is functionally operable in series with a proportional flow control valve with respect to the hydraulic fluid load line,
operating the steering system in a first operational mode in which, when the first steering member is not operated the second steering valve and/or the proportional flow control valve are controlled at least by the second steering member, and
operating the steering system in a second operational mode in which the second steering valve unit and the first steering valve unit are used simultaneously when the first steering member is operated.

15. The method according to claim 14, comprising controlling the second steering valve by an ON/OFF signal for steering the vehicle in a desired steering direction.

16. The method according to claim 14, comprising controlling the proportional flow control valve by one of a PWM-signal, PFM-signal or PSM-signal which can be applied to the proportional flow control valve responsive to the sew steering member for controlling a steering characteristic.

17. The method according to claim 14, comprising, if a steering movement of the first steering member is detected, directing, via the priority valve flow of a part of the hydraulic fluid as a function of at least one pressure signal in a hydraulic fluid load line between the proportional valve and the first steering valve unit.

18. The method according to claim 17, comprising switching off the second steering valve unit if pressure in the hydraulic fluid load line is equal to or above a predetermined pressure limit.

19. The method according to claim 14, comprising triggering the proportional flow control valve if a steering action of the second steering member is detected and no steering is performed with the first steering, member, wherein simultaneously the second steering valve is controlled to provide a desired steering direction indicated by a steering action of the second steering member.

20. The method according to claim 14, comprising preventing selection of a steering mode employing the second steering member at a travel speed of the vehicle above a speed threshold value.

21. The method according to claim 14, comprising preventing a travel speed of the vehicle above a speed threshold value upon selecting a steering mode employing the second steering member.

22. The method according to claim 14, comprising preventing selection of a steering mode employing the second steering member upon selecting a gear which is not compatible with the steering mode employing, the second steering member.

23. The method according to claim 14, comprising preventing selection of a near which is not compatible with the steering mode employing the second steering member upon selecting a steering mode employing the second steering member.

24. The method according to claim 14, comprising in a second operational mode, triggering the second steering valve unit if a steering action of the first steering member is detected by measuring the pressure on a load signal line and/or by measuring at least one of detecting steering, steering direction or steering speed, wherein the second steering valve unit and the first steering valve unit are providing simultaneously the flow of hydraulic fluid to the steering cylinder, and thus enhancing the effect of the action of the operator on the first steering member.

25. Computer comprising a computer program code adapted to perform a method or for use in a method according to claim 14.

26. The computer according to claim 25, wherein the computer is adapted to be connected to the internet and download the computer program code to a control unit or one of its components.

27. Computer program product stored on a non-transitory computer readable medium, comprising a program code for use in a method according to claim 14.

\* \* \* \* \*